United States Patent
Xiao et al.

(10) Patent No.: US 11,960,570 B2
(45) Date of Patent: Apr. 16, 2024

(54) LEARNING CONTRASTIVE REPRESENTATION FOR SEMANTIC CORRESPONDENCE

(71) Applicant: NVIDIA Corporation, Santa Clara, CA (US)

(72) Inventors: Taihong Xiao, Merced, CA (US); Sifei Liu, Santa Clara, CA (US); Shalini De Mello, San Francisco, CA (US); Zhiding Yu, Santa Clara, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 383 days.

(21) Appl. No.: 17/412,091

(22) Filed: Aug. 25, 2021

(65) Prior Publication Data
US 2023/0074706 A1  Mar. 9, 2023

(51) Int. Cl.
*G06F 18/00* (2023.01)
*G06F 18/213* (2023.01)
(Continued)

(52) U.S. Cl.
CPC ........ *G06F 18/2155* (2023.01); *G06F 18/213* (2023.01); *G06N 3/08* (2013.01); *G06V 10/22* (2022.01); *G06V 30/1444* (2022.01)

(58) Field of Classification Search
CPC ..... G06F 18/2155; G06F 18/213; G06N 3/08; G06N 3/045; G06N 3/0464; G06N 3/084; G06N 3/0895; G06V 10/22; G06V 30/1444; G06V 10/74; G06V 10/772; G06V 10/774; G06V 10/955; G06V 10/82
See application file for complete search history.

(56) References Cited

U.S. PATENT DOCUMENTS

| | | | |
|---|---|---|---|
| 2020/0034976 A1* | 1/2020 | Stone | G06F 18/22 |
| 2021/0142116 A1* | 5/2021 | Jaipuria | G06V 10/774 |

(Continued)

OTHER PUBLICATIONS

Kim, S., et al., "DCTM: Discrete-continuous transformation matching for semantic flow," In IEEE International Conference on Computer Vision (ICCV), pp. 4529-4538, 2017.
(Continued)

*Primary Examiner* — Van D Huynh
(74) *Attorney, Agent, or Firm* — Leydig, Voit & Mayer, Ltd.

(57) ABSTRACT

A multi-level contrastive training strategy for training a neural network relies on image pairs (no other labels) to learn semantic correspondences at the image level and region or pixel level. The neural network is trained using contrasting image pairs including different objects and corresponding image pairs including different views of the same object. Conceptually, contrastive training pulls corresponding image pairs closer and pushes contrasting image pairs apart. An image-level contrastive loss is computed from the outputs (predictions) of the neural network and used to update parameters (weights) of the neural network via backpropagation. The neural network is also trained via pixel-level contrastive learning using only image pairs. Pixel-level contrastive learning receives an image pair, where each image includes an object in a particular category.

20 Claims, 13 Drawing Sheets

(51) Int. Cl.
   *G06F 18/214* (2023.01)
   *G06N 3/08* (2023.01)
   *G06V 10/22* (2022.01)
   *G06V 30/14* (2022.01)

(56) References Cited

U.S. PATENT DOCUMENTS

| | | | | |
|---|---|---|---|---|
| 2021/0390611 | A1* | 12/2021 | Guo | G06F 16/9535 |
| 2022/0148242 | A1* | 5/2022 | Russell | G06N 3/084 |
| 2022/0188577 | A1* | 6/2022 | Chopde | G06V 10/82 |
| 2022/0300764 | A1* | 9/2022 | Liu | G06V 20/635 |
| 2022/0383037 | A1* | 12/2022 | Pham | G06N 3/09 |
| 2022/0398402 | A1* | 12/2022 | Jin | G06V 10/454 |

OTHER PUBLICATIONS

Han, K., et al., "SCNET: Learning semantic correspondence," In IEEE International Conference on Computer Vision (ICCV), 2017.

Rocco, I., et al., "End-to-end weakly-supervised semantic alignment," In IEEE Conference on Computer Vision Pattern Recognition (CVPR), pp. 6917-6925, 2018.

Kim, S., et al., "Recurrent transformer networks for semantic correspondence," Neural Information Processing Systems (NeurIPS), 31:6126-6136, 2018 (Abstract).

Rocco, I., et al., "Neighbourhood consensus networks," Neural Information Processing Systems (NeurIPS), 2018.

Huang, S., et al., "Dynamic context correspondence network for semantic alignment," IEEE International Conference on Computer Vision (ICCV), pp. 2010-2019, 2019.

Min, J., et al., "Hyperpixel flow: Semantic correspondence with multi-layer neural features," IEEE International Conference on Computer Vision (ICCV), pp. 3394-3403, 2019.

Min, J., et al., "Learning to compose hypercolumns for visual correspondence," In European Conference on Computer Vision (ECCV), 2020.

Lee, J., et al., "Sfnet: Learning object-aware semantic correspondence," In IEEE Conference on Computer Vision and Pattern Recognition (CVPR), pp. 2278-2287, 2019.

Jeon, S., et al., "Parn: Pyramidal affine regression networks for dense semantic correspondence," In European Conference on Computer Vision (ECCV), 2018.

Kim, S., et al., "Fcss: Fully convolutional self-similarity for dense semantic correspondence," IEEE Transactions on Pattern Recognition and Machine Intelligence (PAMI), 41:581-595, 2019.

Liu, Y., et al., "Semantic correspondence as an optimal transport problem," In IEEE Conference on Computer Vision and Pattern Recognition (CVPR), pp. 4463-4472, 2020.

Duchenne, O., et al., "A graph-matching kernel for object categorization," In IEEE International Conference on Computer Vision (ICCV), pp. 1792-1799, 2011.

Liu, C., et al., "Sift flow: Dense correspondence across scenes and its applications," IEEE Transactions on Pattern Recognition and Machine Intelligence (PAMI), 33:978-994, 2011.

Dale, K., et al., "Image restoration using on-line photo collections," IEEE International Conference on Computer Vision (ICCV), pp. 2217-2224, 2009.

Kim, J., et al., "Deformable spatial pyramid matching for fast dense correspondences," IEEE Conference on Computer Vision and Pattern Recognition (CVPR), pp. 2307-2314, 2013.

Zhou, T., et al., "Flowweb: Joint image set alignment by weaving consistent, pixel-wise correspondences," IEEE Conference on Computer Vision and Pattern Recognition (CVPR), pp. 1191-1200, 2015.

Bristow, H., et al., "Dense semantic correspondence where every pixel is a classifier," IEEE International Conference on Computer Vision (ICCV), pp. 4024-4031, 2015.

Hur, J., et al., "Generalized deformable spatial pyramid: Geometry-preserving dense correspondence estimation," IEEE Conference on Computer Vision and Pattern Recognition (CVPR), pp. 1392-1400, 2015.

Taniai, T., et al., "Joint recovery of dense correspondence and cosegmentation in two images," IEEE Conference on Computer Vision and Pattern Recognition (CVPR), pp. 4246-4255, 2016.

Yang, H., et al., "Daisy filter flow: A generalized discrete approach to dense correspondences," IEEE Conference on Computer Vision and Pattern Recognition (CVPR), pp. 3406-3413, 2014.

Lowe, D., et al., "Distinctive image features from scale-invariant keypoints," International Journal on Computer Vision (IJCV), 2004.

Tola, E., et al., "Daisy: An efficient dense descriptor applied to wide-baseline stereo," IEEE Transactions on Pattern Recognition and Machine Intelligence (PAMI), 32:815-830, 2010 (Abstract).

Dalal, N., et al., "Histrograms of oriented gradients for human detection," IEEE Conference on Computer Vision and Pattern Recognition (CVPR), 2005.

Choy, C., et al., "Universal correspondence network," Neural Information Processing Systems (NeurIPS), 2016.

Kanazawa, A., et al., "Warpnet: Weakly supervised matching for single view reconstruction," IEEE Conference on Computer Vision and Pattern Recognition (CVPR), pp. 3253-3261, 2016.

Novotny, D., et al., "Anchornet: A weakly supervised network to learn geometry-sensitive features for semantic matching," In IEEE Conference on Computer Vision and Pattern Recognition (CVPR), pp. 5277-5286, 2017.

Rocco, I., et al., "Convolutional neural network architecture for geometric matching," In IEEE Conference on Computer Vision and Pattern Recognition (CVPR), pp. 6148-6157, 2017.

Hongsuck, P., et al., "Attentive semantic alignment with offset-aware correlation kernels," In European Conference on Computer Vision (ECCV), pp. 349-364, 2018.

Zhou, T., et al., "Learning dense correspondence via 3d-guided cycle consistency," IEEE Conference on Computer Vision and Pattern Recognition (CVPR), pp. 117-126, 2016.

Hjelm, R. Devon, et al., "Learning deep representations by mutual information estimation and maximization," International Conference on Learning Representations (ICLR), 2019.

Chen, T., et al., "A simple framework for contrastive learning of visual representations," International Conference on Machine Learning (ICML), 2020.

He, K., et al., "Momentum contrast for unsupervised visual representation learning," In IEEE Conference on Computer Vision and Pattern Recognition (CVPR), pp. 9729-9738, 2020.

Grill, J.B., et al., "Bootstrap your own latent: A new approach to self-supervised learning," Neural Information Processing Systems (NeurIPS), 2020.

Pathak, D., et al., "Learning features by watching objects move," IEEE Conference on Computer Vision and Pattern Recognition (CVPR), pp. 6024-6033, 2017.

Wang, X., et al., "Unsupervised learning of visual representations using videos," In IEEE International Conference on Computer Vision (ICCV), pp. 2794-2802, 2015.

Wang, X., et al., "Dense contrastive learning for self-supervised visual pre-training," arXiv, 2020.

Pinheiro, P., et al., "Unsupervised learning of dense visual representations," Neural Information Processing Systems (NeurIPS), 2020.

Jabri, A., et al., "Space-time correspondence as a contrastive random walk," Neural Information Processing Systems (NeurIPS), 2020.

Chen, Y., et al., "Deep semantic matching with foreground detection and cycle-consistency," In Asian Conference on Computer Vision (ACCV), pp. 347-362, Springer, 2018.

Van den Oord, A., et al., "Conditional image generation with pixelcnn decoders," Neural Information Processing Systems (NeurIPS), 2016.

Van den Oord, A., et al., "Pixel recurrent neural networks," International Conference on Machine Learning (ICML), 2016.

Vincent, P., et al., "Extracting and composing robust features with denoising autoencoders," In International Conference on Machine Learning (ICML), 2008.

Gidaris, S., et al., "Unsupervised representation learning by predicting image rotations," International Conference on Learning Representations (ICLR), 2018.

(56) References Cited

OTHER PUBLICATIONS

Doersch, C., et al., "Unsupervised visual representation learning by context prediction," IEEE International Conference on Computer Vision (ICCV), pp. 1422-1430, 2015.

Zhang, R., et al., "Colorful image colorization," In European Conference on Computer Vision (ECCV), 2016.

Misra, I., et al., "Shuffle and learn: Unsupervised learning using temporal order verification," In European Conference on Computer Vision (ECCV), 2016.

Noroozi, M., et al., "Unsupervised learning of visual representations by solving jigsaw puzzles," In European Conference on Computer Vision (ECCV), 2016.

Vondrick, C., et al., "Tracking emerges by colorizing videos," In ECCV, 2018.

Van den Oord, A., et al., "Representation learning with contrastive predictive coding," arXiv, abs/1807.03748, 2018.

Li, X., et al., "Joint-task self-supervised learning for temporal correspondence," Neural Information Processing Systems (NeurIPS), 2019.

Wang, X., et al., "Learning correspondence from the cycle-consistency of time," IEEE Conference on Computer Vision and Pattern Recognition (CVPR), pp. 2561-2571, 2019.

He, K., et al., "Deep residual learning for image recognition," IEEE Conference on Computer Vision and Pattern Recognition (CVPR), pp. 770-778, 2016.

Sinkhorn, R., et al., "Diagonal equivalence to matrices with prescribed row and column sums," American Mathematical Monthly, 74:402, 1967 (Abstract).

Ham, B., et al., "Proposal flow: Semantic correspondences from object proposals," IEEE Transactions on Pattern Recognition and Machine Intelligence (PAMI), 40:1711-1725, 2018.

Everingham, M., et al., "The pascal visual object classes challenge: A retrospective," International Journal on Computer Vision (IJCV), 111:98-136, 2014.

Deng, J., et al., "Imagenet: A large-scale hierarchical image database," In IEEE Conference on Computer Vision and Pattern Recognition (CVPR), pp. 248-255, 2009.

Munkres, J., "Algorithms for the assignment and transportation problems," Journal of the Society for Industrial and Applied Mathematics, 10:196-210, 1957 (Abstract).

* cited by examiner

Ground Truth
Correspondence
100

Predicted
Correspondence
340

LEARNING CONTRASTIVE REPRESENTATION FOR SEMANTIC CORRESPONDENCE

BACKGROUND

Conventionally, training a neural network to perform the task of semantic correspondence for images relies on supervised training using labeled training data that may include one or more of object bounding boxes and keypoints. Labeling (non-synthetic) training data with keypoints and bounding boxes is typically a manual process, so the amount of keypoints in each image is limited. Furthermore, the amount image and variety of training data is also limited when labeling is a manual process. Conventional solutions also typically start with a pretrained neural network, such as ImageNet. Reliance on the pretrained neural network and labeled training data may result in a neural network that does not easily adapt to domains/categories that are different compared with what is used during training. There is a need for addressing these issues and/or other issues associated with the prior art.

SUMMARY

Embodiments of the present disclosure relate to neural network learning contrastive representation for semantic correspondence. Systems and methods are disclosed that employ a multi-level contrastive training strategy for training a neural network to learn semantic correspondences at the image level and region or pixel level. The neural network is trained using contrasting image pairs including different objects and corresponding image pairs including different views of the same object. Conceptually, contrastive training pulls corresponding image pairs closer and pushes contrasting image pairs apart in terms of a feature representation learned by the neural network. An image-level contrastive loss is computed from the outputs (predictions) of the neural network and used to update parameters (weights) of the neural network via backpropagation. The image-level contrastive loss may be combined with a pixel or region-level contrastive loss for improved semantic correspondence performance.

Learning dense (e.g., pixel or region level) correspondence across semantically related images has been extensively studied, but still faces two challenges: 1) large appearance, scale and pose variations can exist even if objects are from the same categories, and 2) lack of pixel-level dense correspondences for supervised training. In contrast to conventional systems, pixel-level contrastive learning may use only image pairs without keypoint and/or bounding box labels. Pixel-level contrastive learning receives an image pair, where each image includes an object in a particular category. In an embodiment, the image-level and pixel-level training of the neural network is jointly performed.

A method, computer readable medium, and system are disclosed for learning contrastive representation for semantic correspondence. In an embodiment, the method comprises steps of receiving a first image containing a first object, receiving a second image containing a second object, wherein the first object and the second object are included in a single object category, and identifying a region of the first image as a reference image according to selection criteria. The first image, the second image, and the reference image are processed by a portion of a neural network model, according to parameters of the neural network model, to produce corresponding intermediate two-dimensional (2D) features and the 2D features produced for the reference image are mapped to the 2D features produced for the first image through the 2D features produced for the second image to generate predicted correspondence for the region. A contrastive loss is computed based on the predicted correspondence and the selection criteria for the region and the parameters are updated based on the contrastive loss. In an embodiment, an image-level contrastive loss is combined into the contrastive loss before the parameters are updated.

BRIEF DESCRIPTION OF THE DRAWINGS

The present systems and methods for learning contrastive representation for semantic correspondence are described in detail below with reference to the attached drawing figures, wherein.

DETAILED DESCRIPTION

Systems and methods are disclosed related to learning contrastive representation for semantic correspondence. Semantic correspondence is one of the fundamental problems in computer vision with many applications in object recognition, image editing, semantic segmentation, scene parsing. Semantic correspondence is utilized for applications such as video tracking, object reconstruction, and 3D reconstruction. The goal is to establish dense correspondences across images containing objects or scenes of the same category.

Figure 1A:
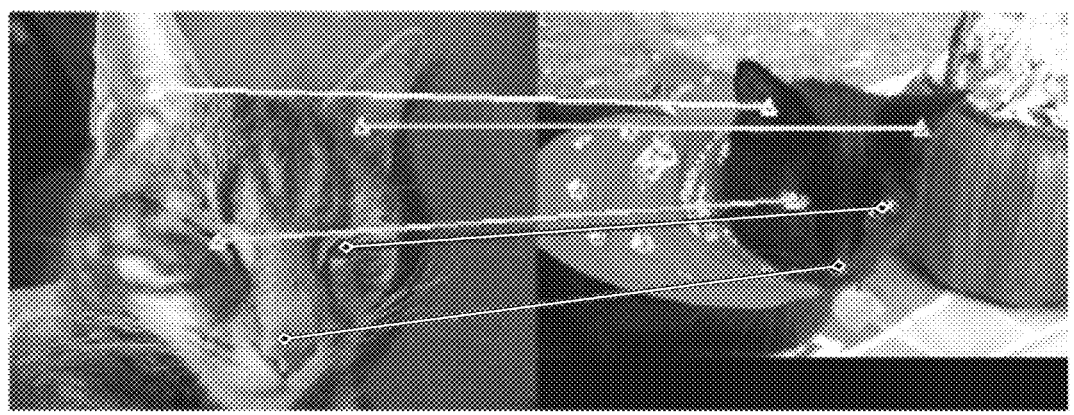
FIG. 1A illustrates ground truth correspondences for a pair of images, in accordance with an embodiment.

FIG. 1A illustrates ground truth correspondence 100 for a pair of images, in accordance with an embodiment. As shown in FIG. 1A, correspondence is established across two cat images, where the semantically similar keypoints such as eyes, nose, or ears of different cats are matched. However, the task is extremely challenging as different objects usually present distinctive appearance, shapes, lighting, poses and scales. Conventional training approaches require labeled images for a particular category annotated with keypoints and/or object bounding boxes, such as the ground truth correspondence 100.

Learning pixel-level correspondence is challenging due to the large amount of human effort required to annotate (non-synthetic) images. As a result, fully-supervised learning of pixel-level matching is very difficult to achieve. To overcome the shortage of annotated images needed for pixel-level correspondence, weakly-supervised signals, e.g., object bounding boxes or foreground masks are sometimes used. Annotating images with bounding boxes and masks is less labor-intensive than annotating keypoints but, providing these annotations at a large scale still requires a huge workload.

Alternatively, other conventional techniques have relied on obtaining good universal feature representations for images, which may be provided by supervised pretraining of a neural network using a large database for visual object classification, such as ImageNet. Benefiting from large-scale labeled images, a supervised pretrained neural network can extract image-level discriminative features, which may be useful for semantic correspondence. However, such a pretrained neural network is typically optimized for specific categories of objects that are present in the training database. Performance of the pretrained neural network often suffers when predicting correspondence for objects that are not present in the training database. In other words, reliance on the pretrained neural network and labeled training data may not produce a trained neural network that generalizes well to other domains and/or unseen categories.

Image class labels may be leveraged as a more convenient weak supervision without pixel-wise annotations or labels. For example, image pairs including objects in the same category provides weak supervision for learning image-level correspondence. A multi-level contrastive learning technique relies on no supervision and/or weak supervision for training, i.e., image pairs of the same category, without fully-supervised training and/or pretrained neural networks.

Contrastive loss may be computed to learn image-level representations without using labeled data. The idea is to push object representations produced by a neural network for different views of the same image closer while pulling that of images including different objects further apart. The feature representation that is learned by the neural network model using image-level contrastive loss may boost the performance of pretext tasks such as video object segmentation and tracking. A fine-grained representation at region or pixel-level to improve dense semantic correspondence performance may be learned without using a pretrained neural network model and/or fully-supervised training using annotated images.

Figure 1B:
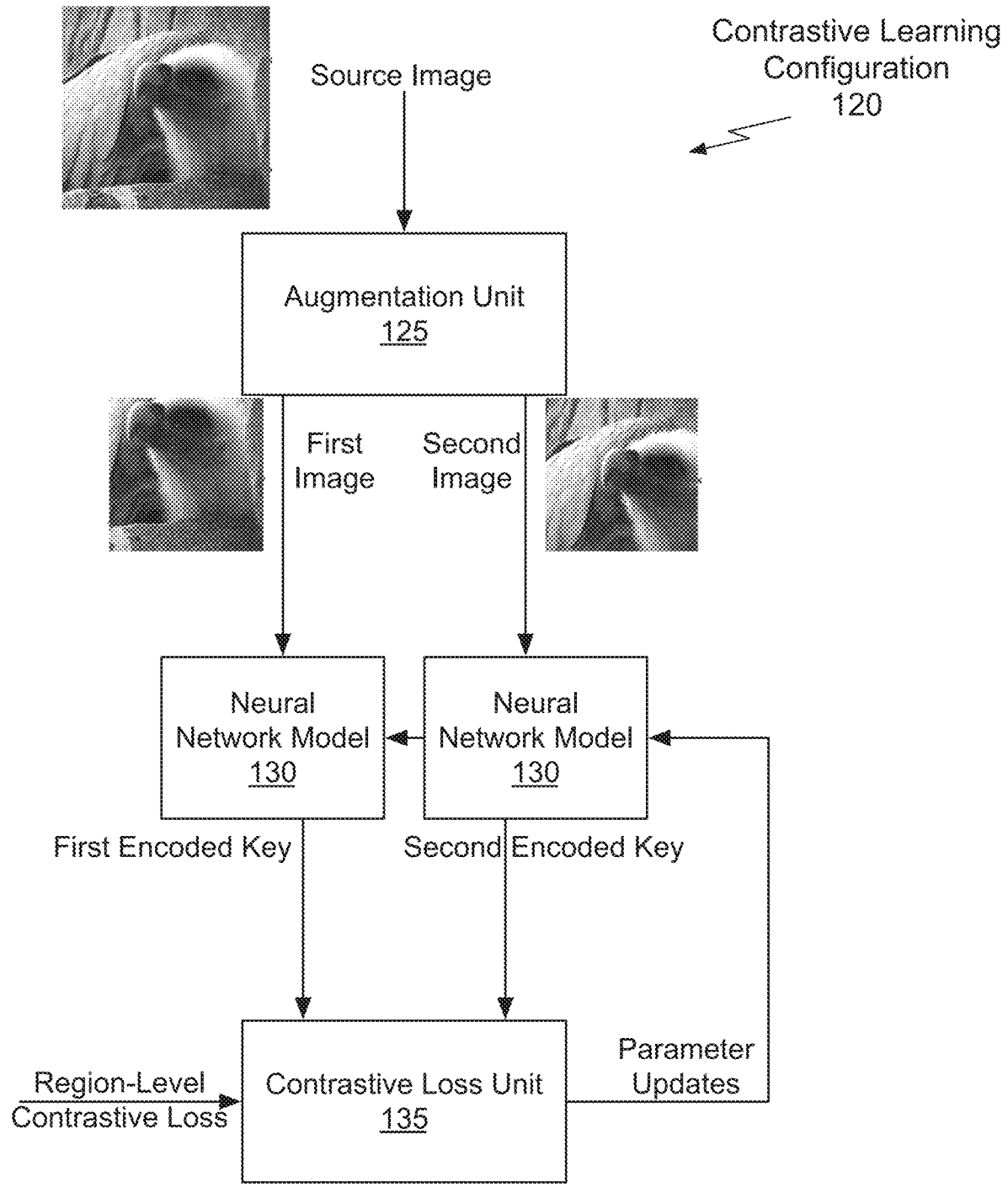
FIG. 1B illustrates a block diagram of an example contrastive learning configuration suitable for use in implementing some embodiments of the present disclosure.

FIG. 1B illustrates a block diagram of an example contrastive learning configuration 120 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the contrastive learning configuration 120 suitable for use in implementing some embodiments of the present disclosure. It should be understood is within the scope and spirit of embodiments of the present disclosure.

The contrastive learning configuration 120 includes an augmentation unit 125, two neural network models 130, and a contrastive loss unit 135. As shown in FIG. 1B, two instances of the neural network model 130 are used to process images in parallel. In an embodiment, a single neural network model 130 is used and images are processed in sequence to produce encoded keys. The contrastive learning configuration 120 trains the neural network models 130 to learn image and region (e.g., pixel) level correspondences.

Image-level contrastive learning aims to learn object-level discriminative features in a self-supervised manner. A representation of any object-centric image is learned by minimizing the distance between two augmented views of the object. As shown in FIG. 1B, a source image is processed by the augmentation unit 125 to produce first and second images that each include the same object from the source image. For image-level contrastive learning, the augmentation unit 125 provides two different views of the same images (e.g., positive samples), by applying augmentations that may include N×N-pixel random scaled cropping, random greyscale conversion, random color jittering, and random horizontal flip. Contrastive learning includes negative samples from different images (images that include different objects) and maximizes the distance in between the negative samples. In an embodiment, at least one negative image pair is included in a training dataset to perform contrastive learning. In an embodiment, image-level contrastive learning can be considered as a dictionary look-up task.

In an embodiment, a dynamic queue of size K stores a set of encoded keys $\{f_1, f_2, \ldots\}$, among which a single positive key $f_k$ matches with $f_q$. In the context of the following description, the encoded keys are outputs (e.g., predictions) of the neural network model 130, such as the first and second encoded keys. For an encoded query $f_q$, its positive key $f_k$ encodes a different view of the same image, while the negative keys encode the views of different images. For example, the first encoded key generated for the first image is a positive key for the encoded query of the second image. Therefore, the image-level contrastive loss $L_q$ is defined as follows:

$$L_q = -\log \frac{\exp(f_q \cdot f_k/\tau)}{\exp(f_q \cdot f_k/\tau) + \sum_{k \neq k}(f_q \cdot f_i/\tau)}, \quad \text{Eq. (1)}$$

where $\tau$ denotes a temperature hyper-parameter. In an embodiment, a region-level contrastive loss is combined with the image-level contrastive loss. The region-level contrastive loss computation is described in conjunction with FIG. 3A.

In an embodiment a first neural network model 130 is a key network and a second neural network model 130 is a query network. Both the query network q and the key network k share the same architecture. In an embodiment, but the query network q is updated based on the image-level contrastive loss or a combination of the image-level contrastive loss and the region-level contrastive loss using backpropagation while the key network k is updated in a momentum fashion:

$$\theta_k \leftarrow m\theta_k + (1-m)\theta_q, \quad \text{Eq. (2)}$$

Where $\theta_q$ and $\theta_k$ are parameters of q and k, and $m \in [0,1)$ denotes the momentum coefficient.

In image-level contrastive learning, each image is regarded as a unique category. Therefore, the image-level contrastive loss $L_q$ is essentially performing a (K+1)-way classification, where K is the size of the queue. Thus, image-level discriminative representations may be learned without using any image labels.

A multi-level contrastive training strategy relies on image pairs (without labels) to learn semantic correspondences at the image level and at the region or pixel level. The neural network 130 is trained using corresponding image pairs including different views of the same object (as shown in FIG. 1B) and contrasting image pairs including different objects. Conceptually, the contrastive loss unit 135 updates the parameters via contrastive training to pull corresponding (positive) image pairs closer and pushes contrasting (negative) image pairs apart. An image-level contrastive loss is computed by the contrastive loss unit 135 from the outputs (predictions) of the neural network 130 and used to update parameters (weights) of the neural network 130 via backpropagation.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1C:
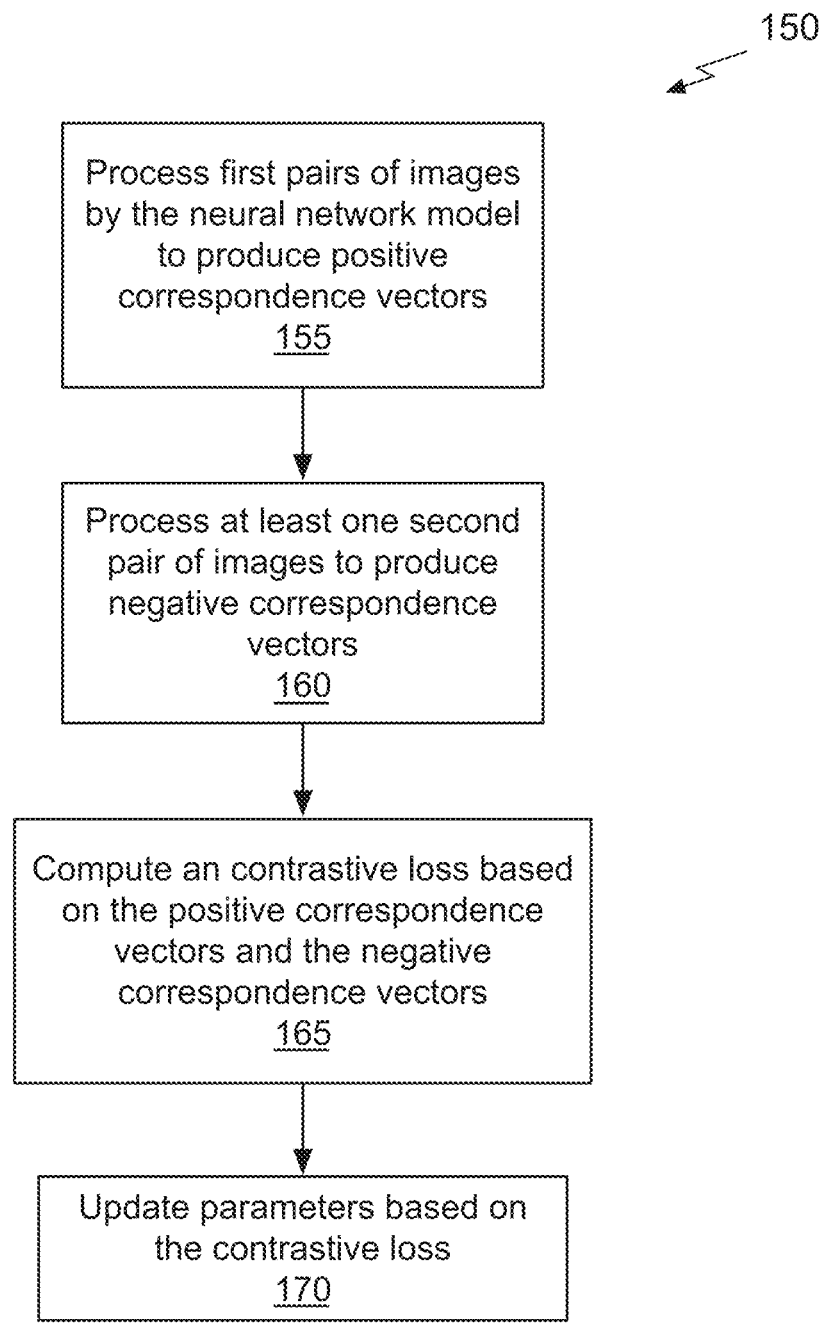
FIG. 1C illustrates a flowchart of a method for contrastive learning, in accordance with an embodiment.

FIG. 1C illustrates a flowchart of a method 150 for contrastive learning, in accordance with an embodiment. Each block of method 150, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 150 is described, by way of example, with respect to the system, contrastive learning configuration 120 of FIG. 1B. However, this method may additionally or alternatively be executed by any one system, or any combination of systems, including, but not limited to, those described herein. Furthermore, persons of ordinary skill in the art will understand that any system that performs method 150 is within the scope and spirit of embodiments of the present disclosure.

At step 155, first pairs of images are processed by the neural network model to produce positive correspondence vectors (e.g., encoded keys). In an embodiment, each pair in the first pairs of images is generated by augmenting a source image that includes an object in a particular category. Other pairs in the first pairs of images are each generated from different source images that also include an object in the particular category. In an embodiment, the augmentation unit 125 generates the pairs in the first pairs of images. In an embodiment, each pair of images is processed by the neural network models 130 according to parameters to produce the positive correspondence vectors. In an embodiment, the parameters are initialized to predetermined values that are not based on training.

At step 160, at least one second pair of images is processed by the neural network model to produce negative correspondence vectors (e.g., encoded keys). In an embodiment, a large number of images (e.g., hundreds or thousands) are used to produce negative correspondence vectors. In an embodiment, the at least one second pair of images includes an image of an object in the particular category and an image of an object in a different category. In an embodiment, the augmentation unit 125 generates each pair in the at least one second pair of images from separate source images. In an embodiment, the at least one second pair of images is processed by the neural network models 130 according to parameters to produce the negative correspondence vectors.

At step 165, a contrastive loss is computed based on the positive correspondence vectors and the negative correspondence vectors. In an embodiment, the contrastive loss is a combination of an image-level contrastive loss and a region-level contrastive loss. In an embodiment, the image-level contrastive loss $L_q$ is computed according to equation (1).

At step 170, parameters of the neural network model are updated based on the contrastive loss. In an embodiment, the parameters are updated using backpropagation. In an embodiment, the neural network model is untrained prior to the updating. In an embodiment, a first neural network model processes one image of each image pair and a second neural network model is updated according to a momentum function, such as equation (2) and does not process any images during training.

To learn a generalizable representation for semantic correspondence, a multi-level contrastive representation is learned using the positive and negative correspondence vectors generated by the neural network model 130 for image-level correspondence and mid-level features generated by the neural network model 130 are used to learn region-level correspondence. The convolutional features at lower (initial) levels of the neural network model 130, namely mid-level 2D features, provide reasonable local correspondences between similar objects. Learning a good representation for high-level tasks, e.g., recognition, may force lower-level features to learn correct correlations at a more fine-grained level. Fine-grained correspondences at the region or pixel-level may be learned using positive image pairs that each include an object in the same category. In an embodiment, cross-instance cycle consistency regularization is enforced at intermediate (e.g., mid-level) feature levels of the neural network model 130 to improve fine-grained feature representation learning compared with using only image-based contrastive learning.

Figure 2A:
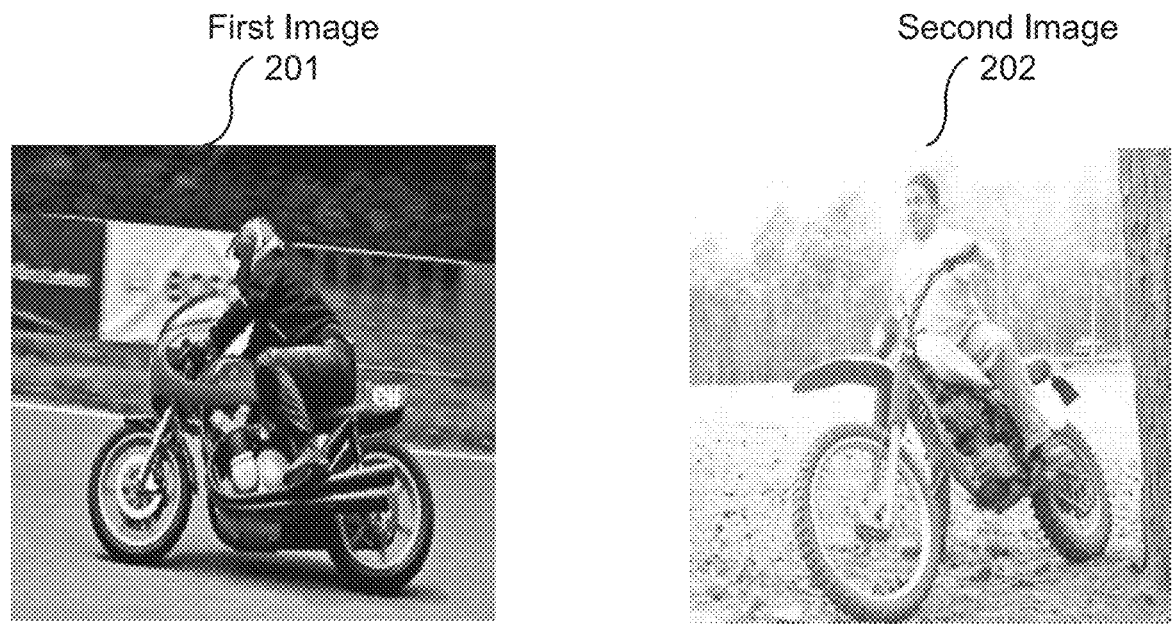
FIG. 2A illustrates first and second input images, in accordance with an embodiment.

FIG. 2A illustrates a first image 210 and a second image 202, in accordance with an embodiment. Region or pixel-level contrastive learning is performed using image pairs, such as the first and second images 201 and 202, where each image contains an object in a particular category. As shown in FIG. 2A, the category is motorcycles. In contrast with two frames from a video sequence, details of the object are different and the backgrounds in the first and second images 201 and 202 are different, unrelated, and independent.

The neural network model 130 processes the first and second images 201 and 202 to produce mid-level features. Compared with the encoded key (e.g., feature vector) that is produced by applying the parameters through the entire neural network 130, the mid-level features are produced by applying a portion of the parameters through one or more of the early layers of the neural network model 130. Furthermore, the encoded key is a vector and the mid-level features are represented using an additional dimension and may be structured as an array.

In an embodiment, the mid-level features are output by a tenth layer of the neural network model 130. In an embodiment, the neural network model 130 does not continue processing the mid-level features to produce the encoded keys. In other words, processing terminates at an intermediate layer. There is no labeled correspondence associated with the input image pair, so a "reference" is generated for self-supervised training purposes.

Figure 2B:
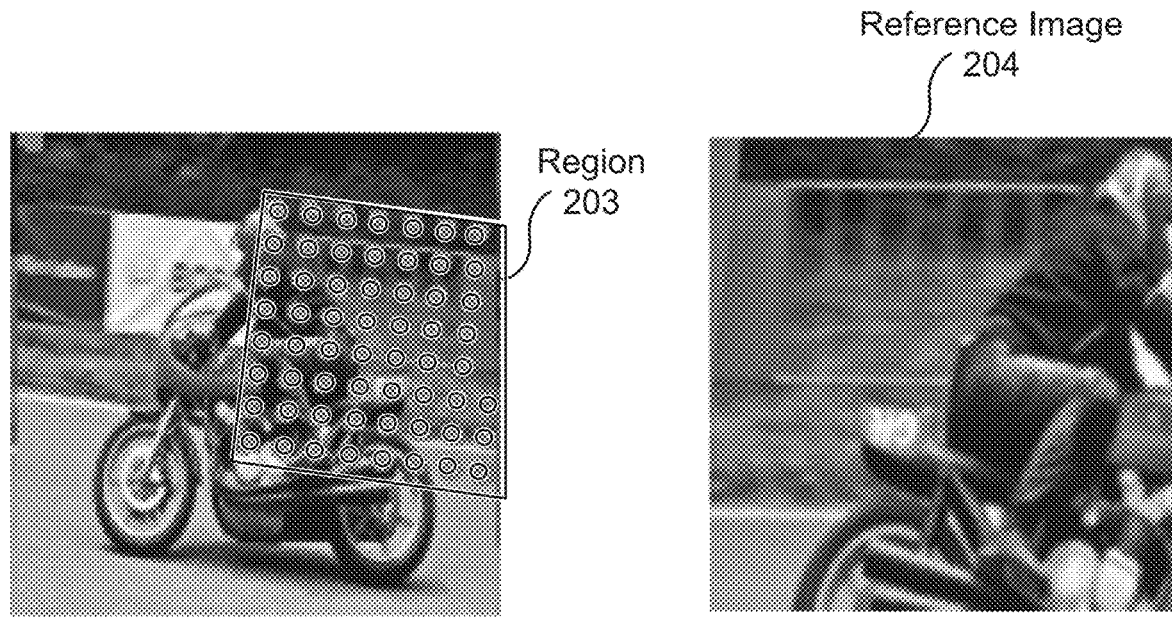
FIG. 2B illustrates a region within the first image and a reference image, in accordance with an embodiment.

FIG. 2B illustrates a region 203 within the first image 201 and a reference image 204, in accordance with an embodiment. In an embodiment, the region 203 or patch is identified according to selection criteria (e.g., self-attention) to generate the reference image 204. The region 203 includes a uniform array of pixels, hyperpixels, or samples shown as circles. As shown in FIG. 2B, one or more augmentations (e.g., horizontal flip or reflection) may be applied to the region 203 to produce the reference image 204. The region selection criteria and one or more augmentations that are used to produce the reference image 204 define a ground truth correspondence for the first image 201 that is used for self-supervision. Importantly, the reference image 204 includes the object and pixel-level correspondence between the first image 201 and the reference image 204 is defined (via the selection criteria and augmentation).

In an embodiment, the region 203 may be identified based on an attention map that identifies a foreground object in the first image 201. In an embodiment, the attention map is generated by computing a similarity between an intermediate feature vector generated for each pixel, and a global feature vector generated for the entire image 201. In an embodiment, the intermediate feature vector and the global feature vector are computed within the neural network model 130 during the processing of the first image 201. In an embodiment, the intermediate feature vector is an input to a last pooling layer.

Figure 2C:
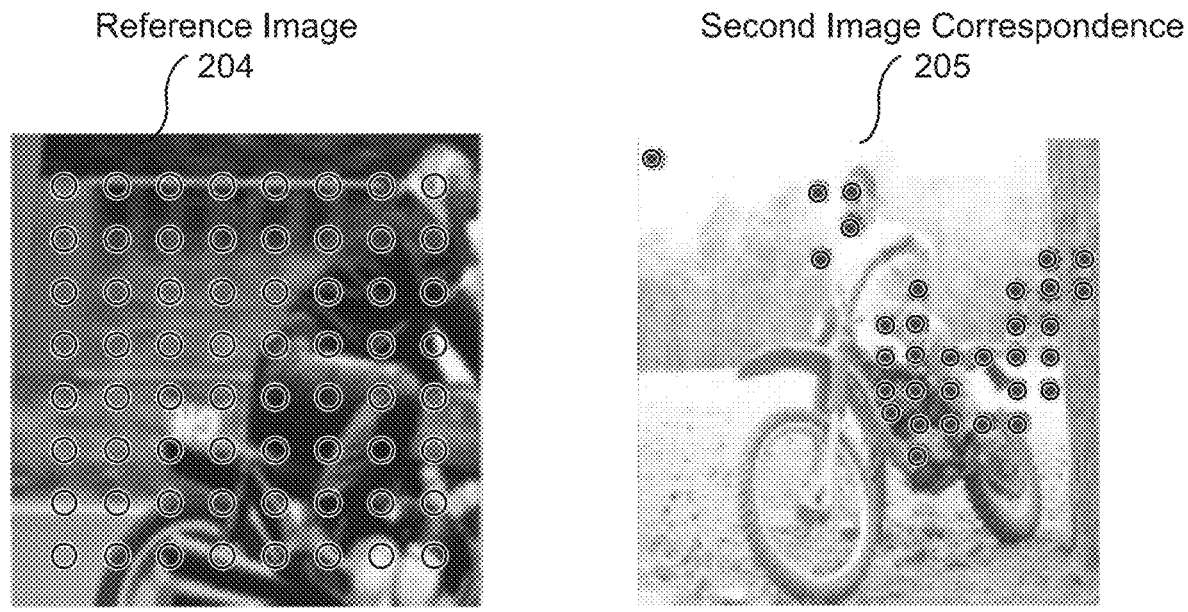
FIG. 2C illustrates correspondence between the reference image and the second image, in accordance with an embodiment.

FIG. 2C illustrates correspondence between the reference image 204 and the second image 202, in accordance with an embodiment. The reference image 204 includes multiple samples and/or pixels illustrated as circles in FIG. 2C. The uniform array of samples are mapped from the reference image 204 to the second image 202, resulting in the mapped samples shown as second image correspondence 205. The mapping is based on similarity, so that a mid-level feature sample computed for the reference image 204 is mapped to a most similar sample computed for the second image 202. Each sample in the second image correspondence 205 corresponds with at least one sample for the reference image 204.

A first affinity matrix is computed using 2D mid-level features generated by the neural network model 130 for the reference image 204 and the second image 202. In an embodiment, the first affinity matrix is computed using the mid-level features for the region 203 after the one or more augmentations are applied to the mid-level features. An affinity matrix is a generic matrix that defines the similarity of two points in space or time. The first affinity matrix defines the mapping of corresponding samples between the mid-level features of the reference image 204 and the second image 202. A second affinity matrix is computed using 2D mid-level features generated for the first image 201 and the second image 202. The second affinity matrix defines a mapping from the mid-level features of the second image 202 to the first image 201. The first and second affinity matrices may be multiplied to produce a third affinity matrix between the mid-level features of the reference image 204 and the first image 201.

Figure 2D:
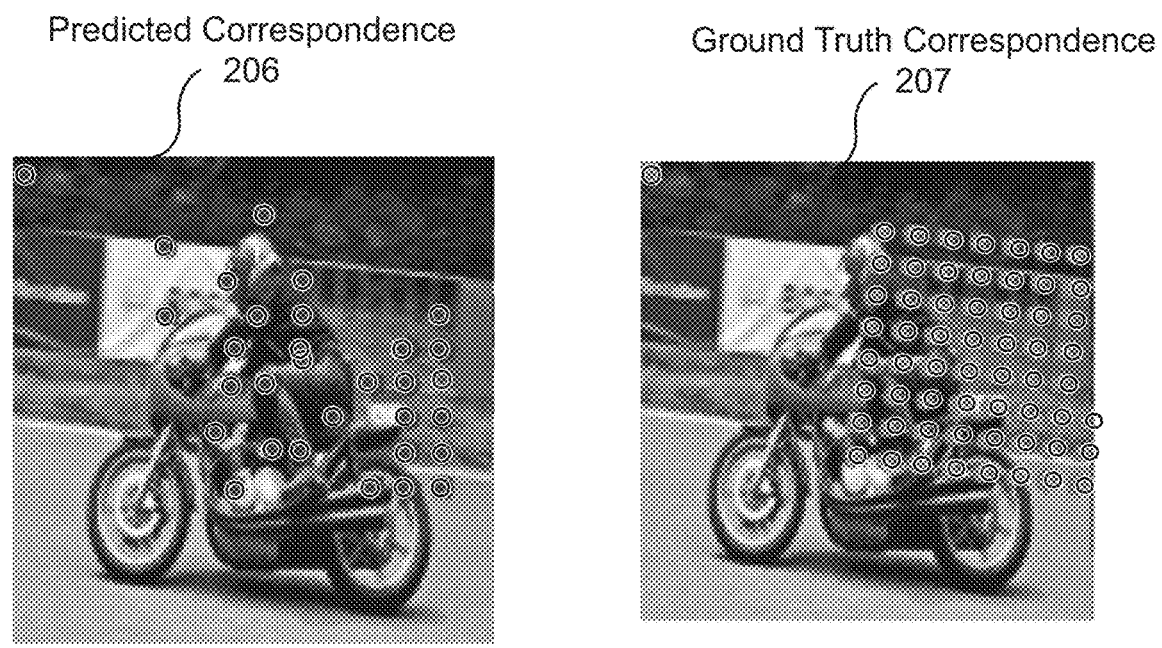
FIG. 2D illustrates mapping the reference image to the first image and ground truth correspondence, in accordance with an embodiment.

FIG. 2D illustrates mapping the reference image 204 to the first image 201 and ground truth correspondence 207, in accordance with an embodiment. The samples shown in predicted correspondence 206 may be produced by applying the third affinity matrix to the samples of the reference image 204. The samples in the predicted correspondence 206 correspond with the samples in the second image correspondence 205. Ideally, the samples in the predicted correspondence 206 would align with the samples in the ground truth correspondence 207.

The ground truth object and region-level correspondence is known and defined by the selection criteria and augmentations used to generate the reference image 204. The ground truth correspondence 207 is compared with the predicted correspondence 206 to compute a region-level contrastive loss. Cross-instance consistency is enforced by requiring samples from the reference image 204 to be mapped back to the region 203 in the first image 201 from which the samples are selected (and augmented), through the (different) second image 202. The region-level contrastive loss is backpropagated to update parameters of the neural network model 130. The region-level contrastive loss may be combined with the image-level contrastive loss to update the parameters during joint training of image-level and region-level correspondence.

In summary, given a pair of images with semantically similar objects, selected pixels from the source image are tracked to the target image and then back to the source image via the affinity matrices. Mapping of the samples back to the original location is enforced via the cross-instance cycle consistency. Essentially, the cycle consistency is equivalent to region-level contrastive learning, where the path of each sample can be considered as either positive or negative depending on whether the selected samples mapped through the target image align or not in the source image. As shown in FIG. 2D, some of the samples in the predicted correspondence 206 align with samples in the ground truth correspondence 207 while others do not.

Figure 3A:
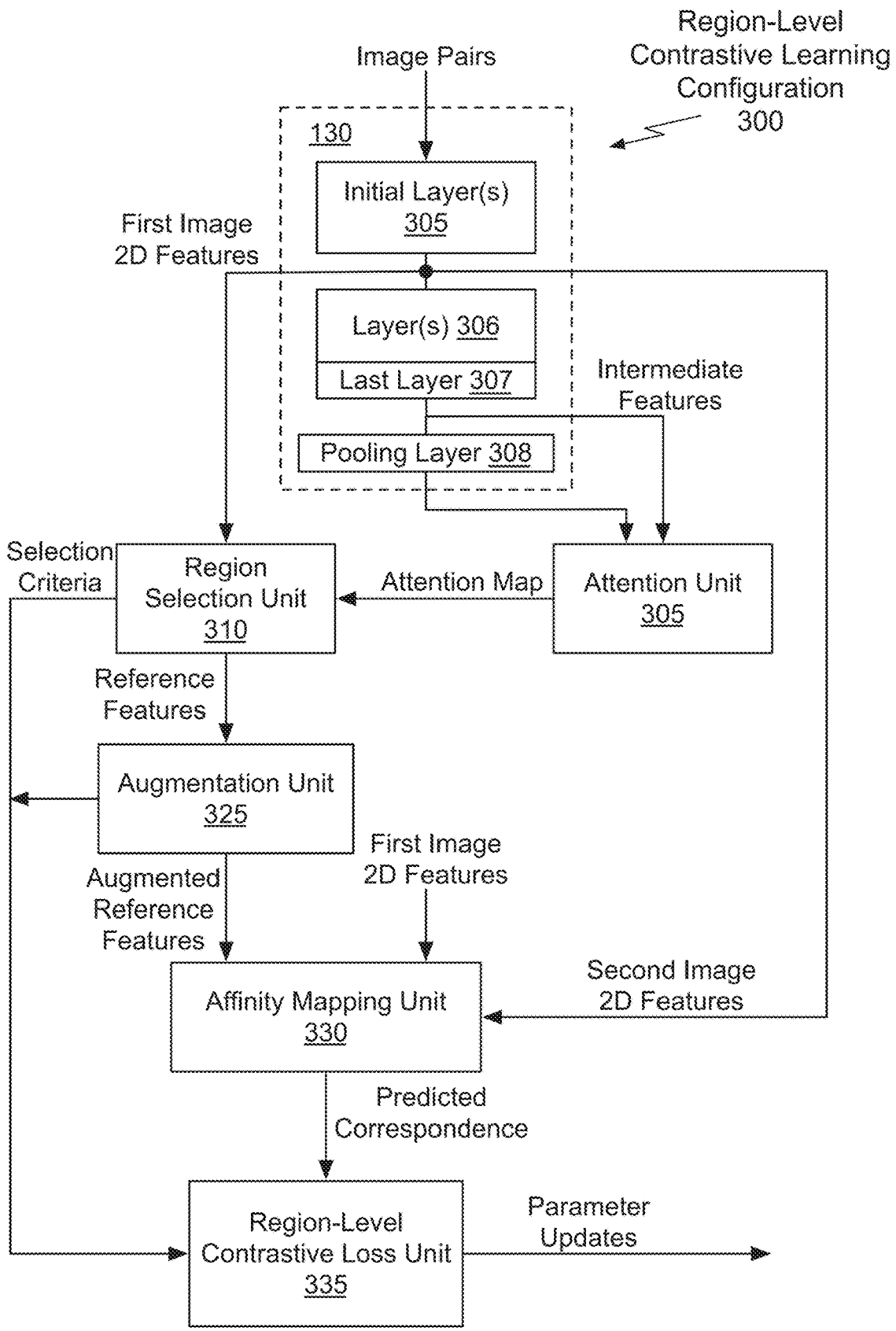
FIG. 3A illustrates a block diagram of an example region-level contrastive learning configuration suitable for use in implementing some embodiments of the present disclosure.

FIG. 3A illustrates a block diagram of an example region-level contrastive learning configuration 300 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the region-level contrastive learning configuration 300 suitable for use in implementing some embodiments of the present disclosure. It should be understood is within the scope and spirit of embodiments of the present disclosure.

A pair of images including a first image $I_0$ and a second image $I_1$ containing different objects of the same category are provided as the inputs. Each image pair is processed by initial layer(s) 305 of the neural network model 130 to extract first and second image 2D mid-level features $F_0$ and $F_1$. The first image 2D features are processed by layer(s) 306, a last layer 307, and a pooling layer 308 within the neural network model 130 to produce intermediate features and the (global) feature vector $f_0$ for the first image. In general, the initial layers 305 learn low-level vision clues, e.g., color and texture, while higher-level layer(s) 306 are trained to be invariant w.r.t. different local regions.

In an embodiment, the neural network model 130 comprises a convolutional neural network architecture such as ResNet50. ResNet50 is described in detail by He, Kaiming et al, in "Deep residual learning for image recognition" IEEE Conference on Computer Vision and Pattern Recognition (CVPR), pages 770-778, 2016. The ResNet50 comprises 48 convolutional layers, one max pooling layer, and one average pooling layer. In an embodiment, the final output dimension of the neural network model 130 is set to 128 for image-level contrastive learning. In an embodiment, the neural network model 130 comprises four convolutional layers that each include residual blocks (res-blocks), a global average pooling, and a fully connected layer. In an embodiment, the feature after the 13th res-block (i.e., the layer 3 feature) is the 2D features that are used to compute the affinity matrices for region-level contrastive learning. Note that the 2D features size is 1/M of the input image size, so the correspondence prediction may be upsampled by bilinear interpolation and multiplied by M.

An attention unit 305 processes the intermediate features and the feature vector for the first image to produce an attention map highlighting a foreground object region. Based on the attention map, $I_0'$ is generated by a region selection unit 310 that selects a region of the first image 2D features as reference features. In an embodiment, instead of selecting a region of the first image 2D features, a region of the first image is selected according to the attention map and the reference features are extracted from the region by the initial layer(s) 305.

In an embodiment, one or more spatial data augmentations are applied to the selected region by an augmentation unit 325 to produce augmented reference features $F_0'$. In an embodiment, the spatial data augmentations may include, but are not limited to random horizontal flip, rotation, and cropping. In an embodiment, the augmentation unit 325 rotates and crops the first image features based on the selection criteria computed by the region selection unit 310 to produce the reference features. The augmentation unit 325 may also apply additional augmentation to the reference features. Note that FIGS. 2A through 2D illustrate images rather than 2D features to illustrate the concept of cross-instance cycle consistency.

For image-level contrastive learning, augmentation provides two different views of the same images. For region-level contrastive learning the goal is to provide correspondence ground truth for the source image and its augmented versions. To avoid trivial solutions, multiple spatial augmentations are leveraged, which may include, in order: random horizontal flips, random rotations, and random cropping with a patch size of N×N-pixels. The random cropping may be based on the attention map given by the attention unit 305, i.e., cropping around the position with the largest value in the attention map.

The attention unit 305 is used to avoid sampling features from background regions of the images. The attention unit 305 may enable removal of false positive samples in the background so that semantic correspondence performance is improved. For the given source image $I_0$, the extracted feature $f_0 \in \mathbb{R}^C$ is output by the global pooling layer 308 and the intermediate features $K_0 \in \mathbb{R}^{C \times H \times W}$ are extracted and output by the last layer 307, where C, H, and W denote the channel number, height, and width, respectively, of the feature map. As the feature map $K_0$ keeps the spatial location information of pixels in $I_0$, the attention unit 305 may compute the cosine between normalized $f_0$ and all feature vectors in the normalized attention map $K_0$.

Given a pair of images $I_0$ and $I_1$, the associated mid-level features are $F_0 \in \mathbb{R}^{C \times H_0 W_0}$ and $F_1 \in \mathbb{R}^{C \times H_1 W_1}$. The correlation matrix $R_{01} \in \mathbb{R}^{H_0 W_0 \times H_1 W_1}$ be used to represent the pixel-level similarity as:

$$R_{01} = F_0^T F_1. \qquad \text{Eq. (3)}$$

For dense correspondence, the ideal correlation matrix should be sparse enough to ensure one-to-one mapping. However, it is challenging to model a sparse matrix in a deep neural network. In an embodiment, the one-to-one mapping of the sparse constraint is relaxed and the correlation matrix is instead encouraged to be sparse by normalizing each row with the softmax function. The resulting similarity score distribution can be peaky and only a few pixels with high similarity in the source image are typically matched to each point in the target image. The affinity matrix is defined as:

$$A_{01} = \text{softmax}\left(\frac{R_{01}}{t}\right), \qquad \text{Eq. (4)}$$

where t is the temperature hyperparameter controlling how peaky the normalized distribution is. The affinity matrix enjoys many good properties: 1) The summation over each row is 1 when softmax is applied to the row dimension. 2) The multiplication of two affinity matrices results in an affinity matrix. 3) The affinity matrix can be used to trace or map the corresponding pixel and mid-level feature locations of feature $F_0$ in the target feature $F_1$, defined by $P_{01} = A_{01} G_1$, where $G_1 \in \mathbb{R}^{H_1 W_1 \times 2}$ is a vectorized standard location map (i.e., each element denotes its horizontal and vertical positions).

In an embodiment, region-level contrastive learning is conducted by formulating the correspondence as a graph, where the nodes are image pixels, and edges are weighted by the similarities between their features in the latent space. Starting from $I_0'$ to $I_1$ and then back to $I_0$, the pixels are tracked or mapped by computing two affinity matrices following equation (4) using the mid-level features. An affinity mapping unit 330 receives the augmented reference features $F_0'$, the first image 2D features $F_0$, and the second image 2D features $F_1$ and computes affinity maps. Specifically, the augmentation unit 325 computes a first affinity map $A_{0'1}$ between $F_0'$ and $F_1$, a second affinity map $A_{10}$ between $F_1$ and $F_0$, and a third affinity map $\overline{A}_{0'0}$ between $F_0'$ and $F_0$. The third affinity map is computed as a product of the first and second affinity maps $\overline{A}_{0'0} = A_{0'1} A_{10} \in \mathbb{R}^{H_0' W_0' \times H_1 W_1}$.

Each element of the cycle affinity matrix $\overline{A}_{0',0}$ depicts a pixel or 2D feature path or cycle from $I_0'$ to $I_0$ passing through $I_1$. Predictions of corresponding pixel or 2D feature locations of the augmented reference image $I_0'$ in the source image $I_0$, are computed as $P=\bar{A}_{0'0}G_0$. The affinity mapping unit 330 outputs the predicted correspondence P between the images in the image pair.

A region-level contrastive loss unit 335 enforces the cross-instance cycle consistency by requiring those 2D features from $I_0'$ to be mapped back to where they are augmented in $I_0$, through a different image $I_1$. As the ground truth correspondence $\hat{P}$ between $I_0'$ and $I_0$ are known, the pixel-level contrastive loss is defined as:

$$L_p=\|P-\hat{P}\|_2 \quad \text{Eq. (5)}$$

Note that equation (5) is a variant of contrastive objective w.r.t. the pixels from a pair of images. Unlike the image-level loss computed by equation (1) that explicitly performs push and pull on the positive and negative pairs, the cycle loss matches a group of "starting" and "ending" pixels. Specifically, all pixels sampled in the walking path are considered positive, while the other pairs are considered negative. The neural network model 130 learns to be pixel-wisely discriminative when the affinity matrix is enforced to be "peaky" in each row.

In an embodiment, information entropy loss can also be used as a regularization term to learn affinity by encouraging more distinctive correspondences. In an embodiment, training the neural network model 130 by the pixel-level contrastive loss with the information entropy loss can further boost performance for semantic correspondence. With the correlation matrix $R \in \mathbb{R}^{H_0 W_0 \times H_1 W_1}$ as defined in equation (3) the correlation entropy is defined as:

$$H(R)=-\frac{1}{H_0 W_0}\sum_{i=1}^{H_0 W_0}\sum_{j=1}^{H_1 W_1}\phi(R)_{ij}\log\phi(R)_{ij}, \quad \text{Eq. (6)}$$

where $\phi(\cdot)$ denotes the row-wise $\ell_1$ normalization, and $\phi(R)_{ij}$ denotes the (i,j)-th elements of $\phi(R)$. Lower correlation entropy indicates the more distinctive correspondences between two images. Therefore, low entropy is encouraged for the image pair $I_0$ and $I_1$, by using the following information entropy loss $$L_r=H(R_{01})+H(R_{10}), \quad \text{Eq. (7)}$$

where $R_{01}$ and $R_{10}$ are correlation matrices between the source and target images. In an embodiment, the region-level contrastive loss unit 335 computes the information entropy loss.

In an embodiment, the neural network model 130 is first trained using the image-level contrastive learning for initialization. Then neural network model 130 is trained under the combination of image-level and region-level contrastive losses along with the information entropy regularization, $$L=\lambda_p L_p+\lambda_q L_q+\lambda_r L_r, \quad \text{Eq. (8)}$$

where $\lambda_p$, $\lambda_q$, and $\lambda_r$ are weight coefficients for the region-level contrastive loss of equation (5), image-level contrastive loss of equation (1), and information entropy loss of equation (7), respectively. In an embodiment, the region-level contrastive loss unit 335 computes the combination of image and region level contrastive losses along with the information entropy loss. In an embodiment, random images from a training database of images are used for the image-level contrastive learning, while image pairs are used for the region-level contrastive learning. In an embodiment, $\lambda_p=0.0005$, $\lambda_r=1$, $\lambda_q=0.001$, and the temperature $t=0.0007$ in equation (4).

Figure 3B:
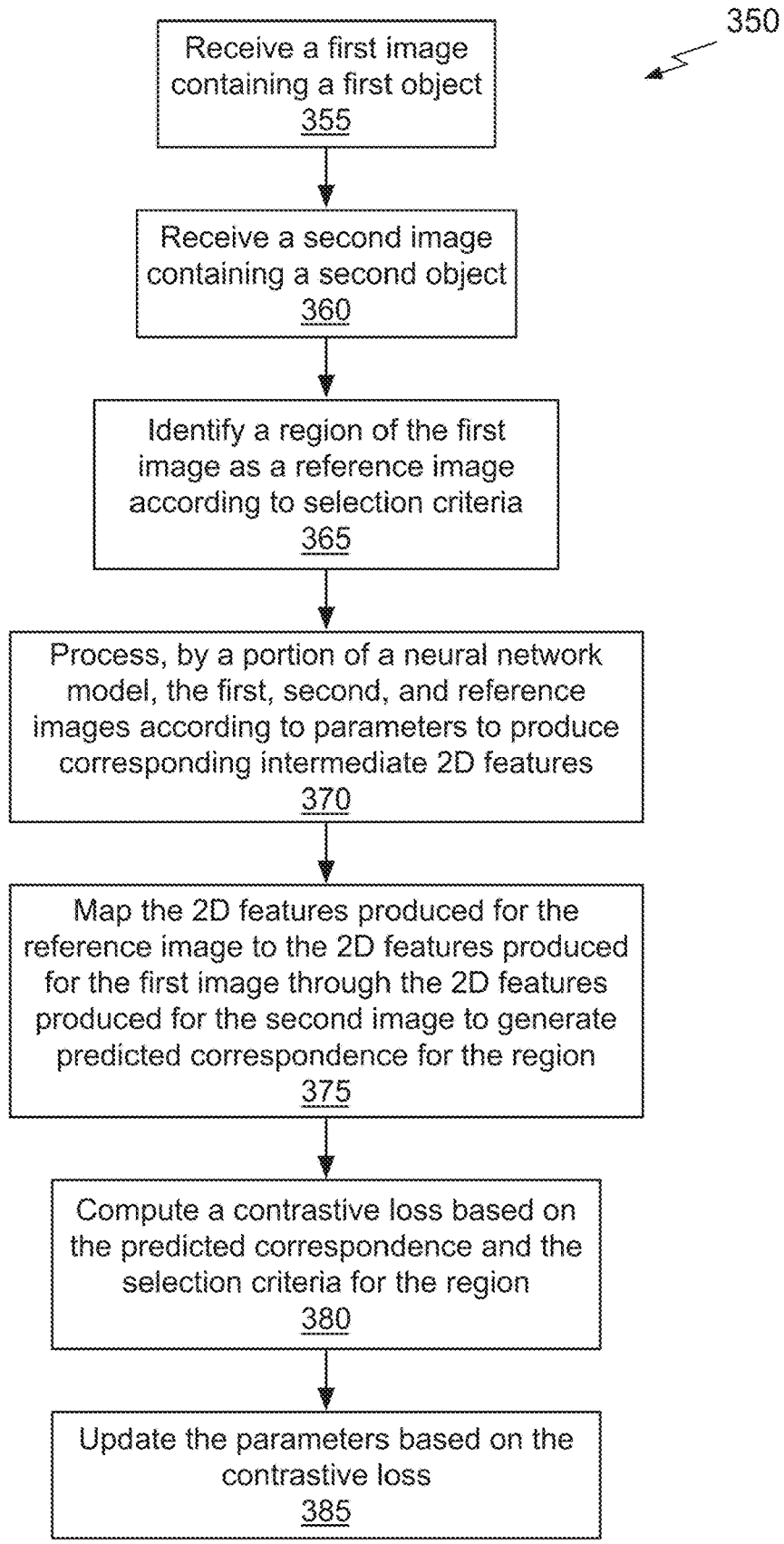
FIG. 3B illustrates a flowchart of a method for region-level contrastive learning, in accordance with an embodiment.

FIG. 3B illustrates a flowchart of a method 350 for region-level contrastive learning, in accordance with an embodiment. Each block of method 350, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 350 is described, by way of example, with respect to the system, region-level contrastive learning configuration 300 of FIG. 3A. However, this method may additionally or alternatively be executed by any one system, or any combination of systems, including, but not limited to, those described herein. Furthermore, persons of ordinary skill in the art will understand that any system that performs method 350 is within the scope and spirit of embodiments of the present disclosure.

At step 355, a first image containing a first object is received at a neural network model, such as the neural network model 130. At step 360, a second image containing a second object is received at the neural network model, where the first object and the second object are included in a single object category.

At step 365, a region of the first image is identified as reference image according to selection criteria. In an embodiment, the selection criteria comprise an attention map. In an embodiment, the attention map is computed by processing the intermediate 2D features produced for the first image by the neural network model to extract first features before an output layer of the neural network model and second features at the output layer. The attention map indicates similarities between the first features and the second features.

At step 370, the first, second, and reference images are processed by a portion of a neural network model, according to parameters, to produce corresponding intermediate 2D features. In an embodiment, at least one augmentation is applied to the reference image before the reference image is processed by the portion of the neural network model. In an embodiment, the neural network model is untrained when the first second and reference images are processed. In an embodiment, parameters of the neural network model are initialized by performing image-level training for semantic correspondence.

At step 375, the 2D features produced for the reference image are mapped to the 2D features produced for the second image to generate predicted correspondence for the region. In an embodiment, the mapping comprises computing first affinity based on the intermediate 2D features produced for the reference image and the intermediate 2D features produced for the second image, computing second affinity based on the intermediate 2D features produced for the second image and the intermediate 2D features produced for the first image, and using a product of the first affinity and the second affinity to generate the predicted correspondence for the region. In an embodiment, the predicted correspondence is computed as $P=\bar{A}_{0'0}G_0$. In an embodiment, the first affinity and the second affinity each comprise a pixel-level transformation matrix.

At step 380, a contrastive loss is computed based on the predicted correspondence and the selection criteria for the region. In an embodiment, the contrastive loss is computed based on at least one augmentation that is applied to the reference image before step 370. In an embodiment, the contrastive loss is combined with an image-level contrastive loss before step 385. In an embodiment, the image-level contrastive loss is computed according to the method 150. In an embodiment, the image-level contrastive loss is computed by processing first pairs of images that contain different views of a third object that is included in the single object category to produce positive correspondence vectors and processing at least one second pair of images to produce negative correspondence vectors. At least one image in the second pair contains a fourth object that is not included in the single object category and an image-level contrastive loss is computed based on the positive correspondence vectors and the negative correspondence vectors.

At step 385, the parameters of the neural network model are updated based on the contrastive loss. In an embodiment, an image-level contrastive loss is combined with the contrastive loss before the parameters are updated. In an embodiment, the same neural network model is used for both image-level correspondence and region or pixel-level correspondence.

Figure 3C:
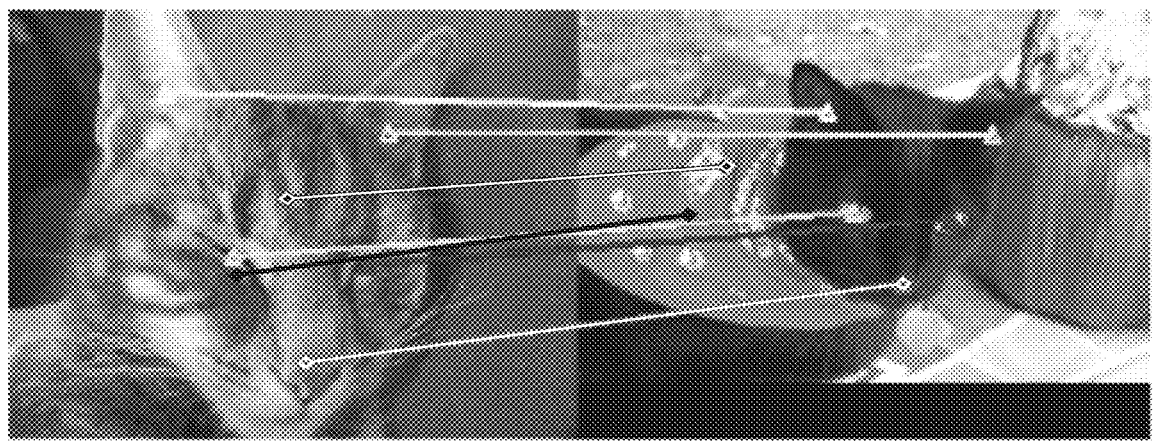
FIG. 3C illustrates correspondences for a pair of images, in accordance with an embodiment.
Figure 3C:
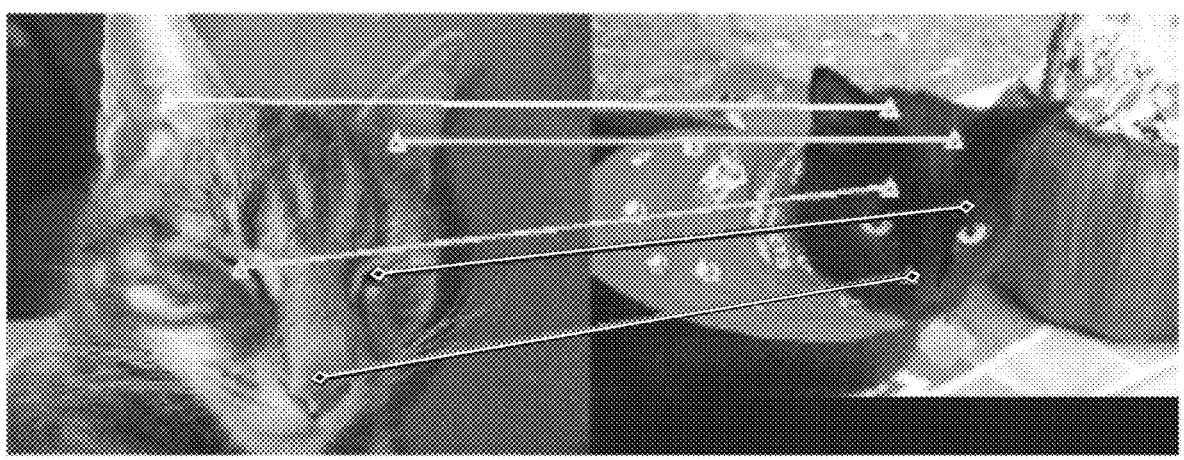

FIG. 3C illustrates correspondences for a pair of images, in accordance with an embodiment. The ground truth correspondence 100 is illustrated for comparison with a predicted correspondence 340 produced by the neural network model 130. The ground truth correspondence 100 illustrates correspondence lines between pairs of correct keypoints. The predicted correspondence 340 illustrates correspondence lines between pairs of predicted keypoints. The neural network model 130 transfers points from a source image to a target image to predict semantic correspondences. To evaluate performance of the trained neural network model 130 in terms of accuracy, differences between the ground truth correspondence and the predicted correspondence are measured for keypoints that are labeled in the ground truth correspondence 100. In an embodiment, the contrastive learning configuration 120 and/or the region-level contrastive learning configuration 300 is used to identify keypoints in the target image.

A multi-level contrastive training strategy jointly trains a neural network model at both image and pixel or region levels. Therefore, even when appearance, scale, viewpoint, and pose variations exist between objects in the same categories in two different images, dense semantic correspondences can be accurately identified by the neural network model. The multi-level training does not require annotated keypoints and/or bounding boxes.

Contrastive training pushes object-level representation of different views from the same image closer, while pulling that of different objects further apart. The intermediate features produced by the neural network model are extracted and used to perform the semantic correspondence at a denser region or pixel-level. Given a pair of images, a patch of the query image is produced, an affinity matrix is used to track the pixels in the patch to a target image, pixels in the target image are tracked back to the query image, and locations of the pixels that are tracked back to the query image are compared with their original locations in the query image to produce gradients. The tracking may be implemented though affinity matrix multiplication with an absolute coordinate map, so that the calculations are differentiable, and the gradients may directly affect the feature representation learned by the neural network model. Because the query and target images are different, the backgrounds are typically entirely independent. Consequently, a self-attention module may be used to ensure that the patch contains the object. The neural network model learns a discriminative pixel-level feature representation for predicting semantic correspondences between images.

Parallel Processing Architecture

Figure 4:
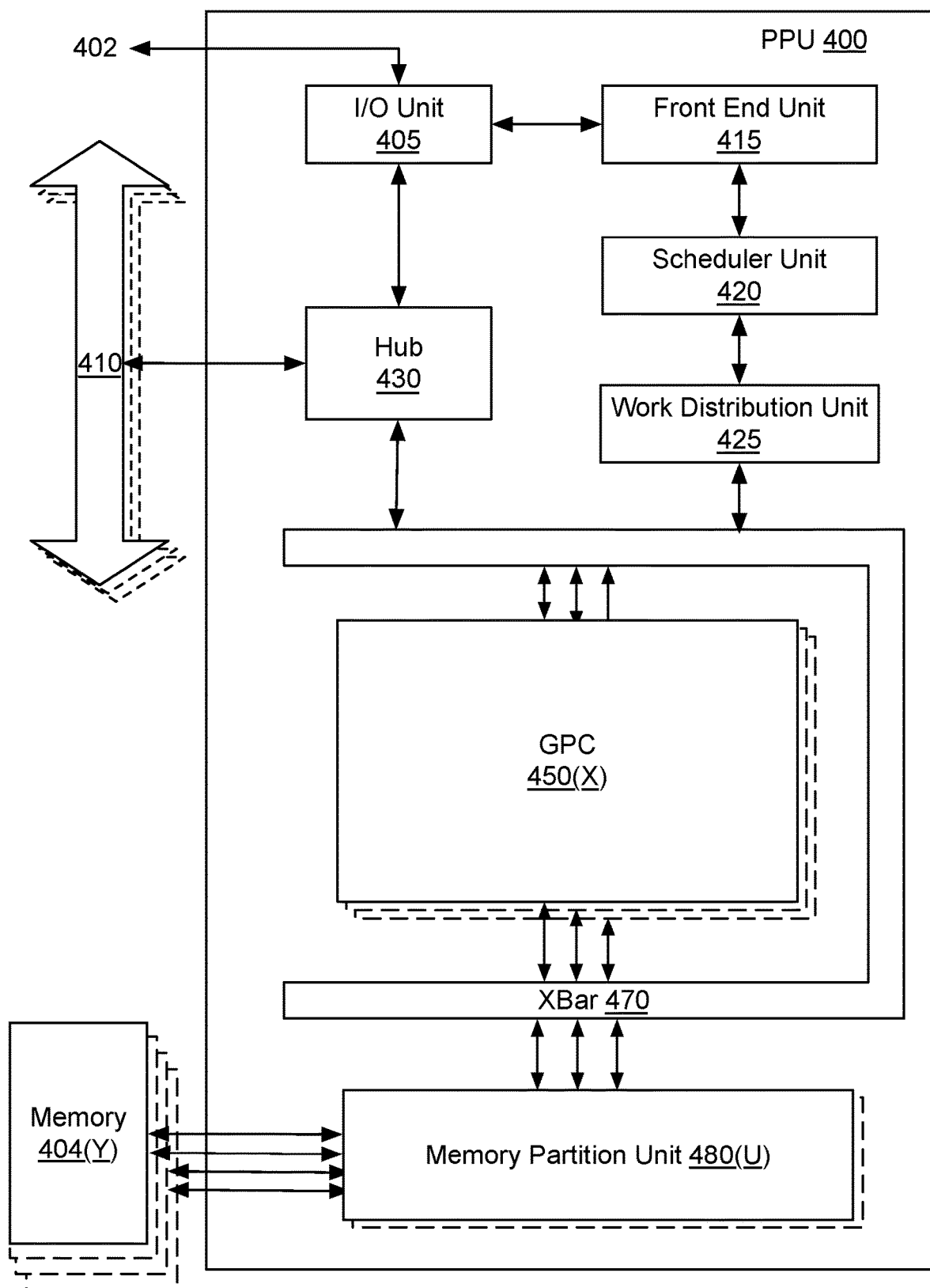
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the contrastive learning configuration 120 and/or the region-level contrastive learning configuration 300. The PPU 400 may be used to implement one or more of the neural network model 130, augmentation unit 125, contrastive loss unit 135, attention unit 305, region selection unit 310, affinity mapping unit 330, augmentation unit 325, and region-level contrastive loss unit 335. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs)

450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
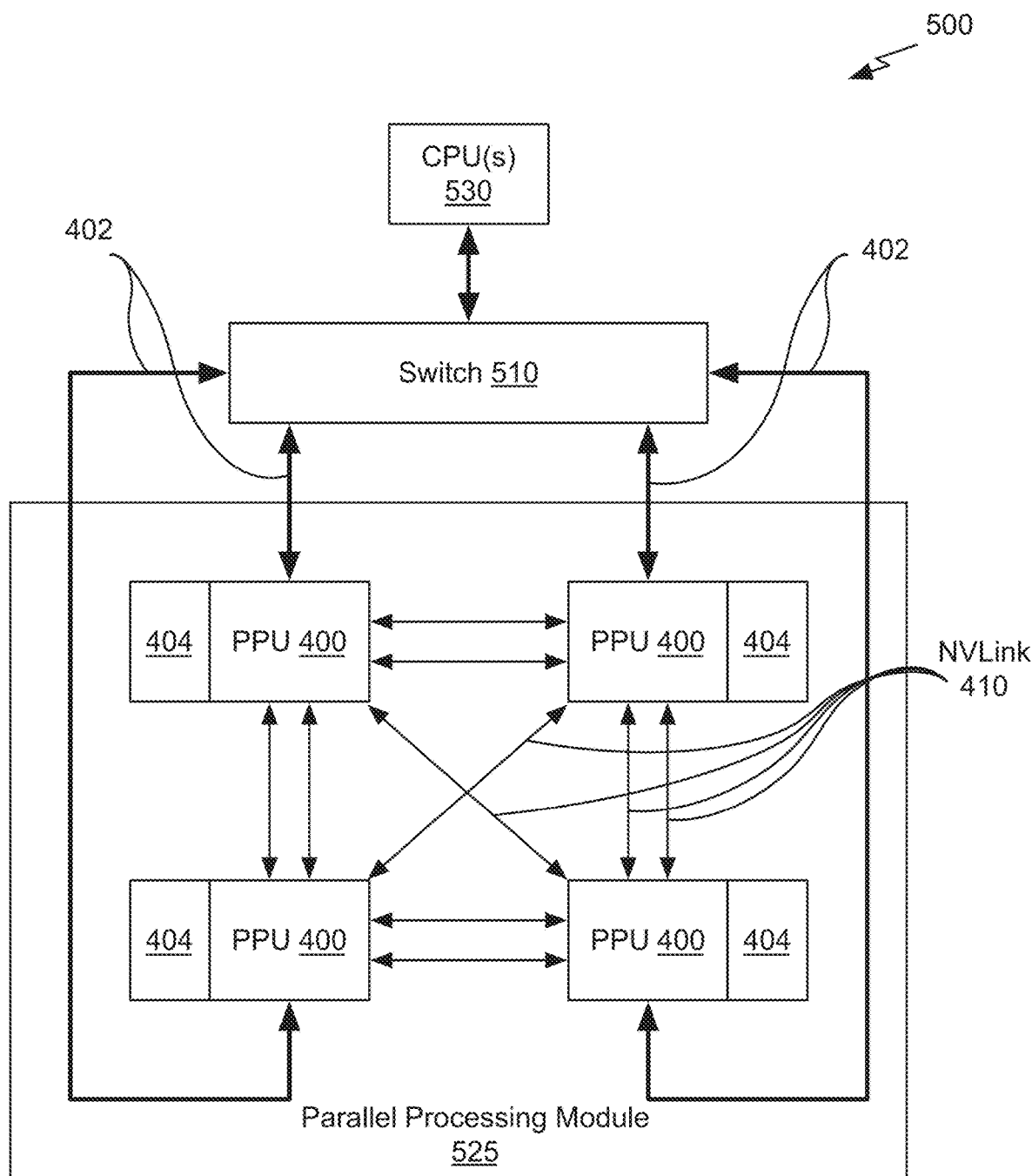
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the method 150 shown in FIG. 1C and/or the method 350 shown in FIG. 3B. The processing system 500 includes a CPU 530, switch 510, and multiple PPUs 400, and respective memories 404.

Figure 5B:
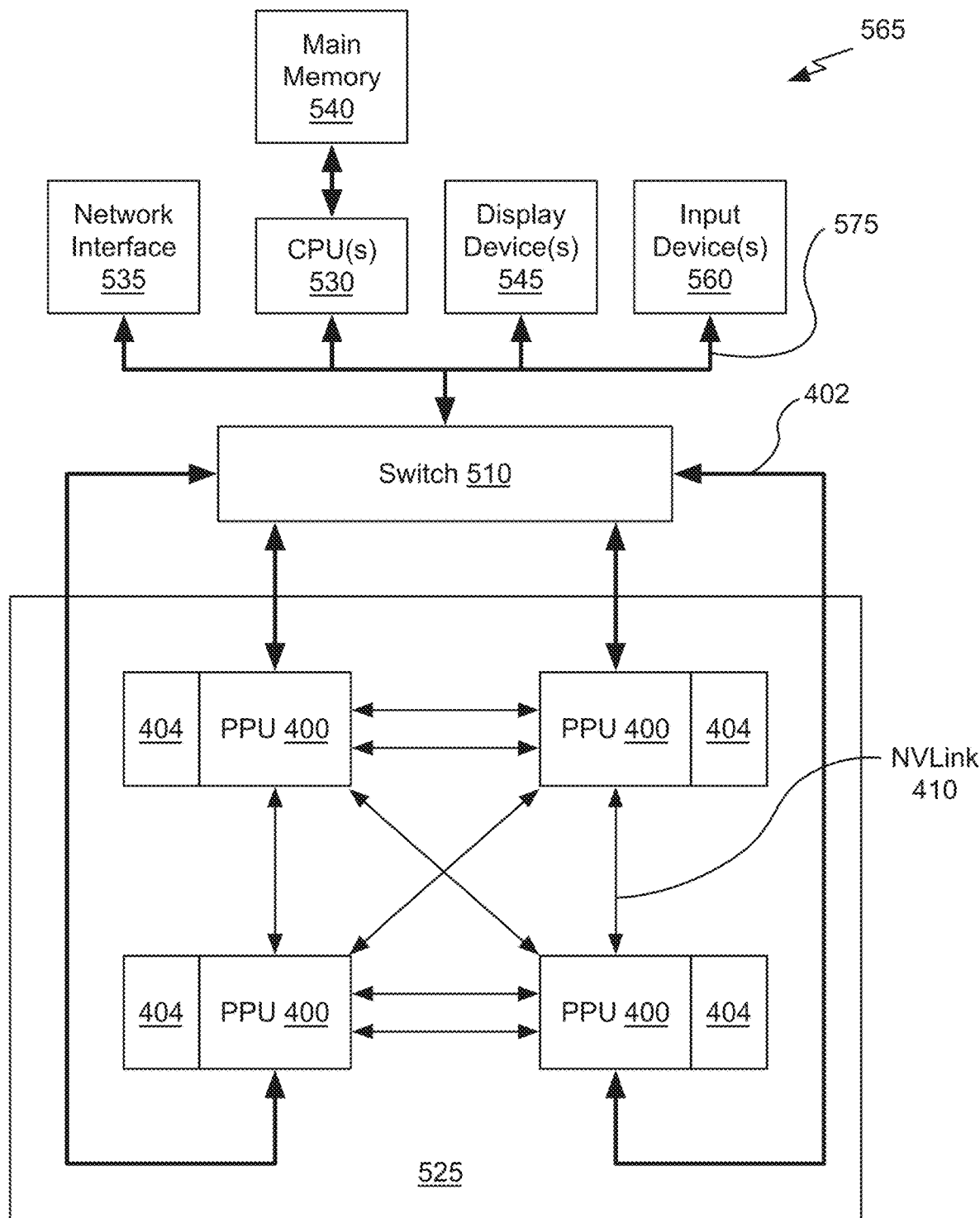
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 150 shown in FIG. 1C and/or the method 350 shown in FIG. 3B.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
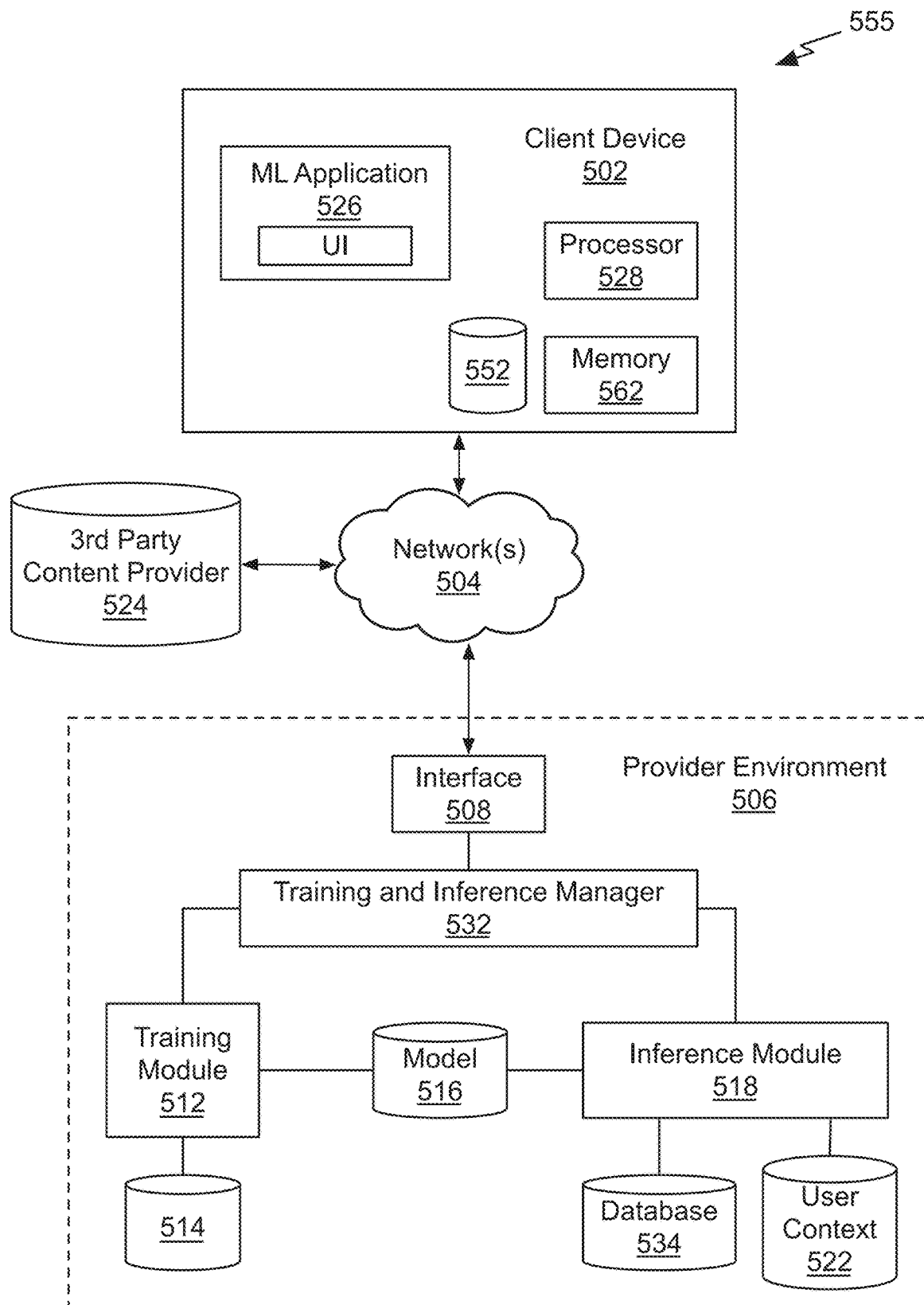
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6:
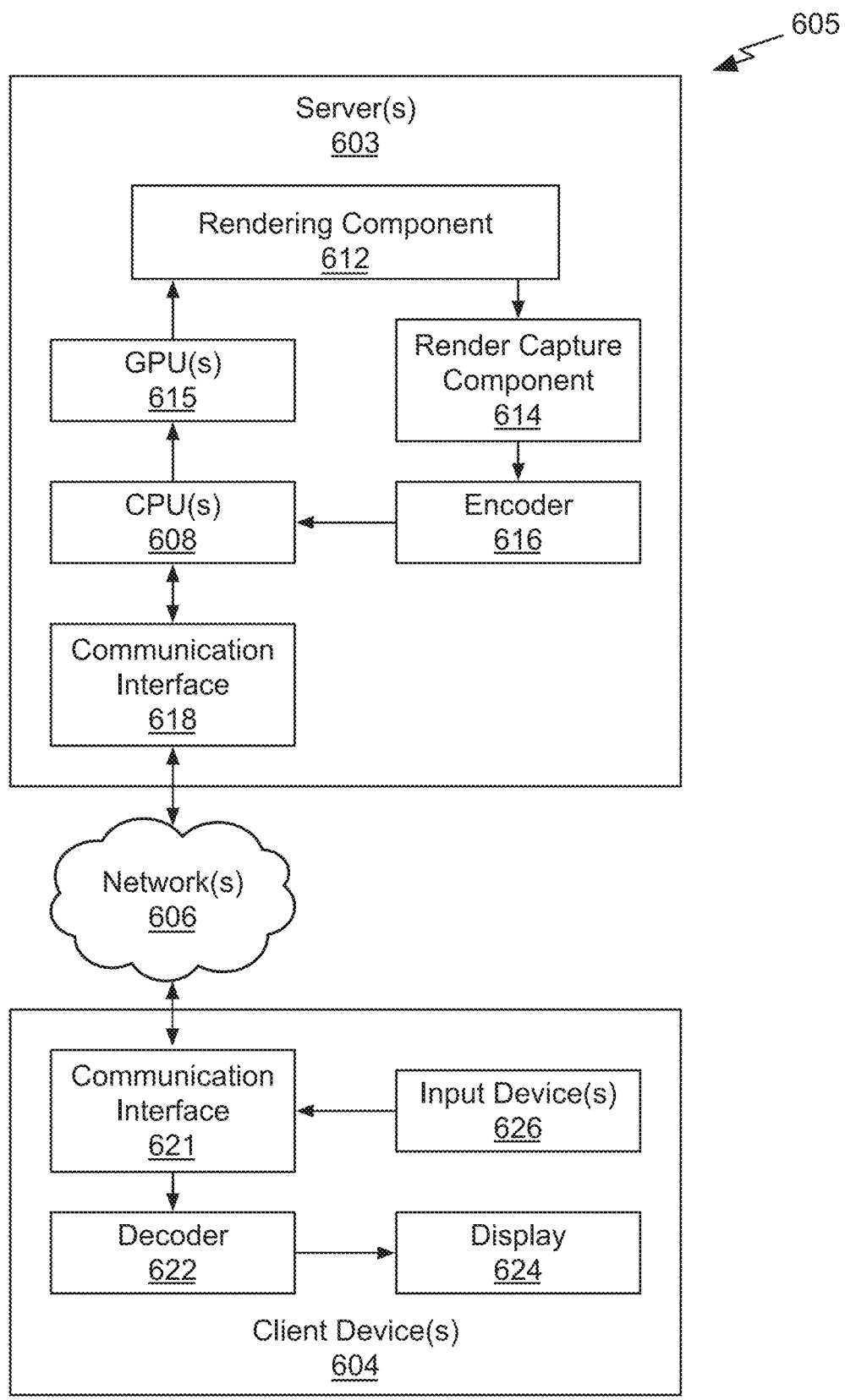
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the sever(s) 604 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
   receiving a first image containing a first object;
   receiving a second image containing a second object, wherein the first object and the second object are included in a single object category;
   identifying a region of the first image as a reference image according to selection criteria;
   processing, by a portion of a neural network model, the first image, the second image, and the reference image according to parameters of the neural network model to produce corresponding intermediate two-dimensional (2D) features;
   mapping the 2D features produced for the reference image to the 2D features produced for the first image through the 2D features produced for the second image to generate predicted correspondence for the region;
   computing a contrastive loss based on the predicted correspondence and the selection criteria for the region; and
   updating the parameters based on the contrastive loss.

2. The computer-implemented method of claim 1, further comprising, before processing the reference image, applying at least one augmentation to the reference image.

3. The computer-implemented method of claim 2, wherein the contrastive loss is computed based on the at least one augmentation.

4. The computer-implemented method of claim 1, further comprising combining the contrastive loss with an image-level contrastive loss before updating the parameters.

5. The computer-implemented method of claim 4, wherein the image-level contrastive loss is computed by:
   processing, by the neural network model, first pairs of images that each contain a third object that is included in the single object category to produce positive correspondence vectors;
   processing at least one second pair of images by the neural network model to produce negative correspondence vectors, wherein at least one image in the second pair contains a fourth object that is not included in the single object category; and
   computing an image-level contrastive loss based on the positive correspondence vectors and the negative correspondence vectors.

6. The computer-implemented method of claim 1, wherein the mapping comprises:
   computing first affinity based on the intermediate 2D features produced for the reference image and the intermediate 2D features produced for the second image;
   computing second affinity based on the intermediate 2D features produced for the second image and the intermediate 2D features produced for the first image; and
   using a product of the first affinity and the second affinity to generate the predicted correspondence for the region.

7. The computer-implemented method of claim 6, wherein the first affinity and the second affinity each comprise a pixel-level transformation matrix.

8. The computer-implemented method of claim 1, wherein the neural network model is untrained prior to the updating.

9. The computer-implemented method of claim 1, wherein the selection criterion comprises an attention map.

10. The computer-implemented method of claim 9, wherein the attention map is produced by:
processing, by a remainder of the neural network model, the intermediate 2D features produced for the first image to extract first features before an output layer of the neural network model and second features at the output layer; and
computing the attention map as similarities between the first features and the second features.

11. The computer-implemented method of claim 1, wherein at least one of the steps of receiving, identifying, processing, mapping, computing, and updating are performed on a server or in a data center and the parameters are streamed to a user device.

12. The computer-implemented method of claim 1, wherein at least one of the steps of receiving, identifying, processing, mapping, computing, and updating within a cloud computing environment.

13. The computer-implemented method of claim 1, wherein at least one of the steps of receiving, identifying, processing, mapping, computing, and updating are performed for training, testing, or certifying a neural network employed in a machine, robot, or autonomous vehicle.

14. The computer-implemented method of claim 1, wherein at least one of the steps of receiving, identifying, processing, mapping, computing, and updating is performed on a virtual machine comprising a portion of a graphics processing unit.

15. A system, comprising:
a memory that stores a first image containing a first object and a second image containing a second object, wherein the first object and the second object are included in a single object category; and
a processor that is connected to the memory, wherein the processor is configured to:
identify a region of the first image as a reference image according to selection criteria;
process, by a portion of a neural network model, the first image, the second image, and the reference image according to parameters of the neural network model to produce corresponding intermediate two-dimensional (2D) features;
map the 2D features produced for the reference image to the 2D features produced for the first image through the 2D features produced for the second image to generate predicted correspondence for the region;
compute a contrastive loss based on the predicted correspondence and the selection criteria for the region; and
update the parameters based on the contrastive loss.

16. The system of claim 15, wherein the processor is further configured to, before processing the reference image, apply at least one augmentation to the reference image.

17. The system of claim 16, wherein the contrastive loss is computed based on the at least one augmentation.

18. The system of claim 15, wherein the processor is further configured to combine the contrastive loss with an image-level contrastive loss before updating the parameters.

19. A non-transitory computer-readable media storing computer instructions that, when executed by one or more processors, cause the one or more processors to perform the steps of:
receiving a first image containing a first object;
receiving a second image containing a second object, wherein the first object and the second object are included in a single object category;
identifying a region of the first image as a reference image according to selection criteria;
processing, by a portion of a neural network model, the first image, the second image, and the reference image according to parameters of the neural network model to produce corresponding intermediate two-dimensional (2D) features;
mapping the 2D features produced for the reference image to the 2D features produced for the first image through the 2D features produced for the second image to generate predicted correspondence for the region;
computing a contrastive loss based on the predicted correspondence and the selection criteria for the region; and
updating the parameters based on the contrastive loss.

20. The non-transitory computer-readable media of claim 19, further comprising combining the contrastive loss with an image-level contrastive loss before updating the parameters.

* * * * *